US011352240B2

(12) United States Patent
Wimmer et al.

(10) Patent No.: US 11,352,240 B2
(45) Date of Patent: Jun. 7, 2022

(54) CRANE

(71) Applicant: Palfinger AG, Salzburg (AT)

(72) Inventors: Eckhard Wimmer, Hallein (AT);
Hannes Steindl, Elsbethen (AT);
Juergen Winkler, Berndorf (AT);
Christoph Roeck, Bad Hofgastein
(AT); Walter Haberl, Nussdorf (AT)

(73) Assignee: PALFINGER AG, Salzburg (AT)

( * ) Notice: Subject to any disclaimer, the term of this patent is extended or adjusted under 35 U.S.C. 154(b) by 477 days.

(21) Appl. No.: 15/010,352

(22) Filed: Jan. 29, 2016

(65) Prior Publication Data
US 2017/0022036 A1 Jan. 26, 2017

Related U.S. Application Data

(63) Continuation of application No. PCT/AT2014/000150, filed on Jul. 29, 2014.

(30) Foreign Application Priority Data

Jul. 31, 2013 (AT) .............................. GM 249/2013

(51) Int. Cl.
B66C 23/84 (2006.01)
B66C 23/42 (2006.01)
F16C 33/10 (2006.01)

(52) U.S. Cl.
CPC .............. *B66C 23/84* (2013.01); *B66C 23/42* (2013.01); *F16C 33/103* (2013.01)

(58) Field of Classification Search
CPC ....... B66C 23/84; B66C 23/86; F16C 33/103; F16C 33/664
(Continued)

(56) References Cited

U.S. PATENT DOCUMENTS 2,147,973 A * 2/1939 Ekbom .................. B66C 23/84
212/247
3,270,899 A * 9/1966 Woolman .................. B60P 1/54
212/231
(Continued)

FOREIGN PATENT DOCUMENTS

CN 1346915 5/2002
CN 201218408 4/2009
(Continued)

OTHER PUBLICATIONS

Austrian Search Report dated Jun. 25, 2014 in corresponding Ausuian Patent Application No. 249/2013 (with English translation).
(Continued)

*Primary Examiner* — Michael R Mansen
*Assistant Examiner* — Juan J Campos, Jr.
(74) *Attorney, Agent, or Firm* — Wenderoth, Lind & Ponack, L.L.P.

(57) ABSTRACT

A crane includes a crane pillar supported rotatably about an axis, and a radial bearing for supporting the rotatable crane pillar in a crane base. The radial bearing is lower in an installation position of the crane pillar, and an upper radial bearing likewise supports the crane pillar in the crane base.

(Continued)

The upper radial bearing is spaced apart at a distance from the lower radial bearing along the axis. At least one chamber can be filled with oil and is provided for lubricating the upper radial bearing. A drive unit is provided for the crane pillar, and the drive unit drives the crane pillar between the upper radial bearing and the lower radial bearing. A driven region on the crane pillar is lubricated with oil by the chamber that can be filled with oil.

12 Claims, 5 Drawing Sheets

(58) Field of Classification Search
USPC .................. 212/253; 384/35, 39, 397, 415
See application file for complete search history.

(56) References Cited

U.S. PATENT DOCUMENTS

| | | | |
|---|---|---|---|
| 4,002,377 A | | 1/1977 | Jangaard |
| 4,463,995 A | * | 8/1984 | Andree .................. B66C 23/84 |
| | | | 384/620 |
| 5,664,692 A | * | 9/1997 | Sauter .................... B66C 23/84 |
| | | | 212/181 |
| 8,641,569 B2 | * | 2/2014 | Morita .................... B66C 23/84 |
| | | | 475/149 |
| 2005/0011848 A1 | | 1/2005 | Rilbe et al. |
| 2013/0045828 A1 | | 2/2013 | Morita et al. |
| 2013/0239722 A1 | | 9/2013 | Völlner et al. |

FOREIGN PATENT DOCUMENTS

| | | | |
|---|---|---|---|
| CN | 102777316 | 11/2012 | |
| CN | 202578492 | 12/2012 | |
| CN | 102918211 | 2/2013 | |
| CN | 202756593 | 2/2013 | |
| CN | 103038542 | 4/2013 | |
| EP | 1 489 037 | 12/2004 | |
| EP | 2 570 700 | 3/2013 | |
| FR | 2 181616 | 4/1972 | |
| JP | 9-144854 | 6/1997 | |
| JP | 2008-232270 | 10/2008 | |
| RU | 2 213 043 | 9/2003 | |
| WO | WO-2011142235 A1 * | 11/2011 | ............. B66C 23/84 |

OTHER PUBLICATIONS

International Search Report dated Oct. 27, 2014 in corresponding International Application No. PCT/AT2014/000150 (with English translation).

* cited by examiner

STATE OF THE ART

STATE OF THE ART

CRANE

BACKGROUND OF THE INVENTION

The invention concerns a crane having a crane pillar mounted rotatably about an axis, and a vehicle having such a crane.

Cranes of the general kind set forth often have two mutually superposed radial bearings—in most cases plain bearings—to make the connection between the base and the crane pillar. A thrust bearing is further provided for transmission of the vertical forces. Often disposed between those two radial bearings is the drive unit which in most cases is in the form of a rack-and-pinion drive with the tooth arrangement required for same on the crane pillar stub and on the toothed rack, respectively. A crane of the general kind set forth is shown, for example, in U.S. Pat. No. 4,002,377 A.

All bearing locations and the tooth arrangement must be smooth-running and protected from corrosion. Therefore they are generally lubricated with a grease suitable for that purpose. That can be effected by way of a feed at each individual location, or by way of a central lubrication arrangement in which the individual lubrication areas are generally collected in a block by hoses or conduits. Re-lubrication is required at defined periods of time. A rotary apparatus of a different general kind with such a lubrication arrangement is shown for example in EP 2 570 700 A1.

FIG. 2 shows a sectional view through a crane according to the state of the art. The crane pillar 1 is supported by a lower radial bearing 2 and an upper radial bearing 3 of a stationary base 21. In addition, a drive unit 4 drives the crane pillar 1 or the movable part thereof. At the driven region 5 of the crane pillar 1, and also at the two axially spaced radial bearings 2, 3, a manual feed of grease is necessary here in the state of the art to be able to guarantee operation of the crane pillar 1.

Alternatively, it is further known from the state of the art to provide an oil bath for the lower radial bearing 2, as is shown in FIG. 3. A disadvantage in this respect is that a manual grease feed for the upper radial bearing 3 is again also required in order to guarantee smooth operation of the crane pillar 1.

SUMMARY OF THE INVENTION

The object of the invention is to provide a mounting arrangement together with a drive unit for the crane pillar in the crane base, that is improved over the state of the art.

Provided for the crane pillar is a drive unit which drives the crane pillar, and the drive unit is located between the upper radial bearing and the lower radial bearing. Lubrication of a driven region at the crane pillar is effected by the common chamber which can be filled with oil, and so lubrication can therefore be effected by one and the same chamber for all moving parts (upper radial bearing, lower radial bearing, and drive region).

Because a chamber is provided at the upper radial bearing which can be filled with oil and by way of which lubrication for the upper radial bearing is effected, it is possible to dispense with continuously recurring re-lubrication of the upper radial bearing as that lubrication by oil which is disposed in the chamber takes place automatically and thus guarantees permanent lubrication.

It has proven to be particularly advantageous if at the lower radial bearing is a chamber which can be filled with oil and by way of which lubrication of the lower radial bearing is effected. Thus permanent lubrication can also be achieved for the lower radial bearing.

Particularly preferably it is provided that lubrication of the lower radial bearing is effected by way of the at least one chamber which can be filled with oil. Thus, one chamber which can be filled with oil is sufficient to lubricate both radial bearings.

A further preferred embodiment provides that at least one thrust bearing is provided for the crane pillar, and lubrication of the at least one thrust bearing of the crane pillar is effected by way of the chamber which can be filled with oil.

According to a preferred embodiment, a common chamber can be filled with oil for the upper radial bearing and for the lower radial bearing. The provision of a common chamber for the upper and the lower radial bearings means that it is only necessary once to fill the chamber with oil in order to provide lubrication for both bearings.

Equally, it has proven to be advantageous if the chamber which can be filled with oil for the upper radial bearing in the operative condition of being filled with oil has an oil level which is higher than an upper end of the upper radial bearing. That implements preferred lubrication for the upper radial bearing as that bearing is thus entirely covered by oil.

A further preferred embodiment provides that the at least one chamber which can be filled with oil is provided substantially completely at the base supporting the crane pillar.

It has proven to be particularly advantageous if the at least one chamber which can be filled with oil is provided substantially completely in the interior of the rotatable crane pillar. That provides a particularly compact variant as the fillable chamber is not disposed outside the crane pillar.

According to a preferred embodiment, at least two chambers are provided which can be filled with oil and by way of which lubrication of the upper radial bearing is effected.

Preferably, the chamber which can be filled with oil supplies oil to the other chamber which can be filled with oil.

In that respect, it is particularly preferable that the at least two chambers which can be filled with oil are connected together by a passage.

It has further proven to be advantageous if one of the at least two chambers which can be filled with oil is provided above the other chamber which can be filled with oil.

Preferably, one of the at least two chambers which can be filled with oil is provided above the upper radial bearing.

In that respect, it has been found to be particularly advantageous if the passage is provided in the interior of the crane pillar.

Also, a vehicle can have a crane according to one of the described embodiments.

BRIEF DESCRIPTION OF THE DRAWINGS

Further details and advantages of the present invention are described more fully hereinafter by specific description with reference to the embodiments by way of example illustrated in the drawing, in which.

DETAILED DESCRIPTION OF THE INVENTION

Figure 1:
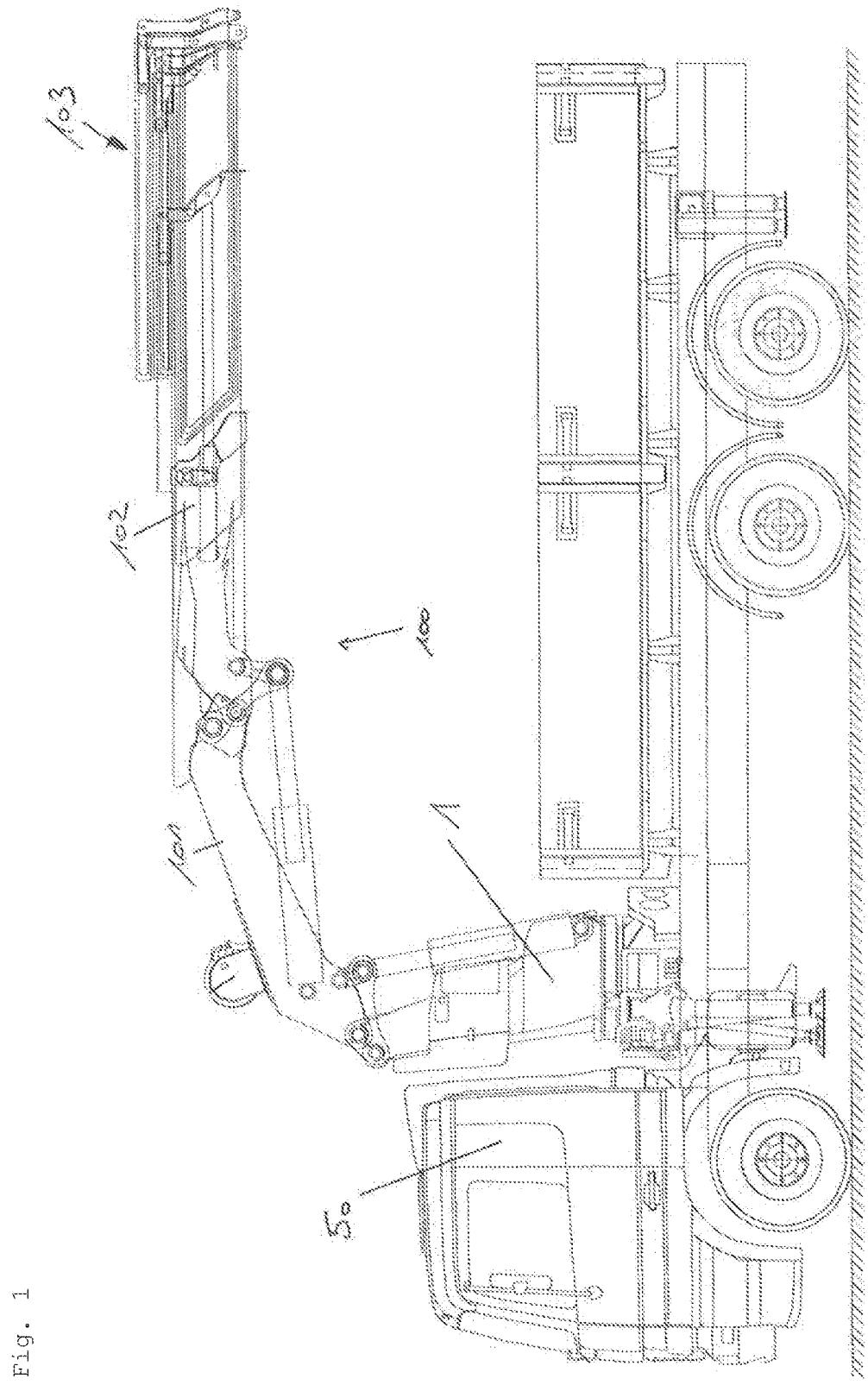
FIG. 1 shows a side view of a vehicle having a crane.
Figure 2:
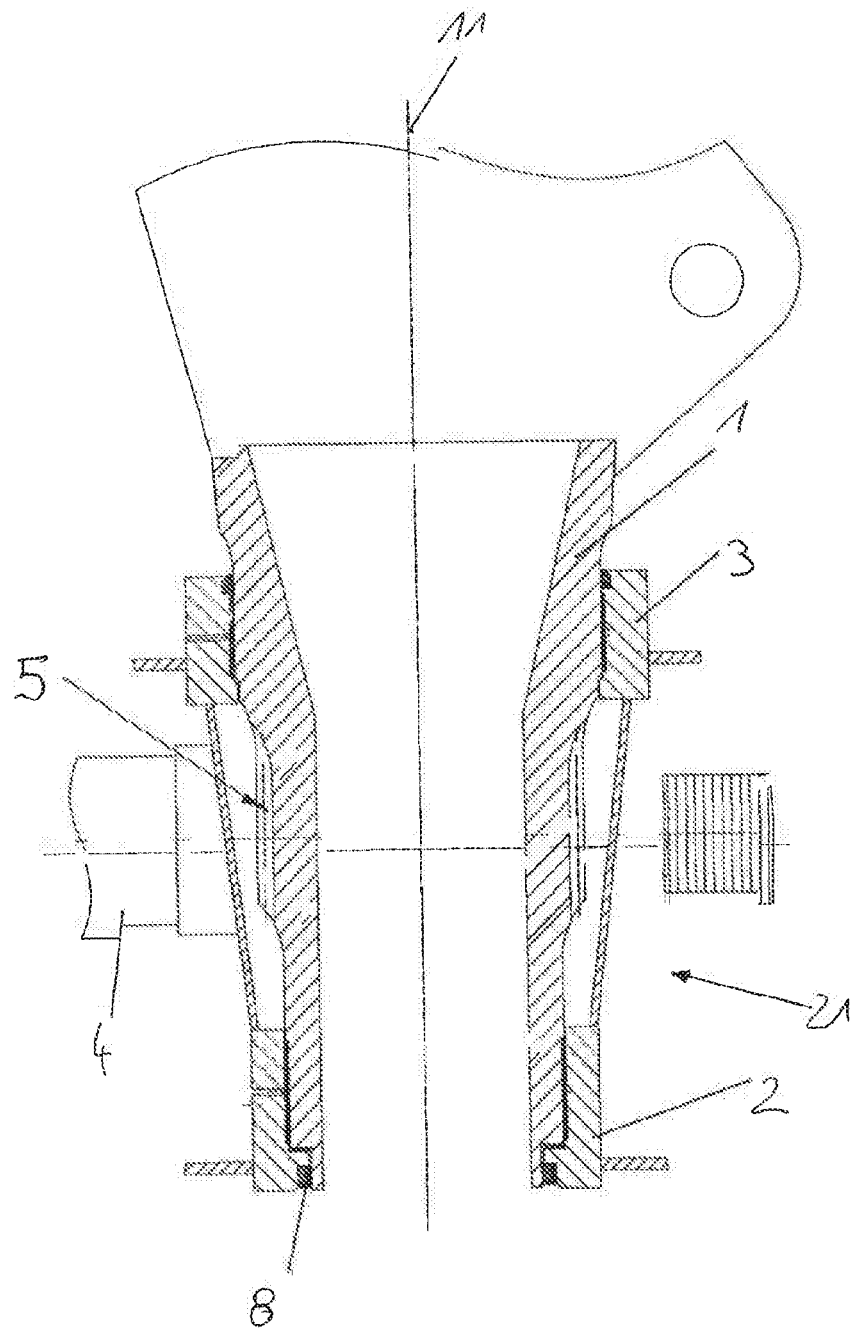
FIG. 2 shows a section through a crane pillar according to the state of the art.
Figure 3:
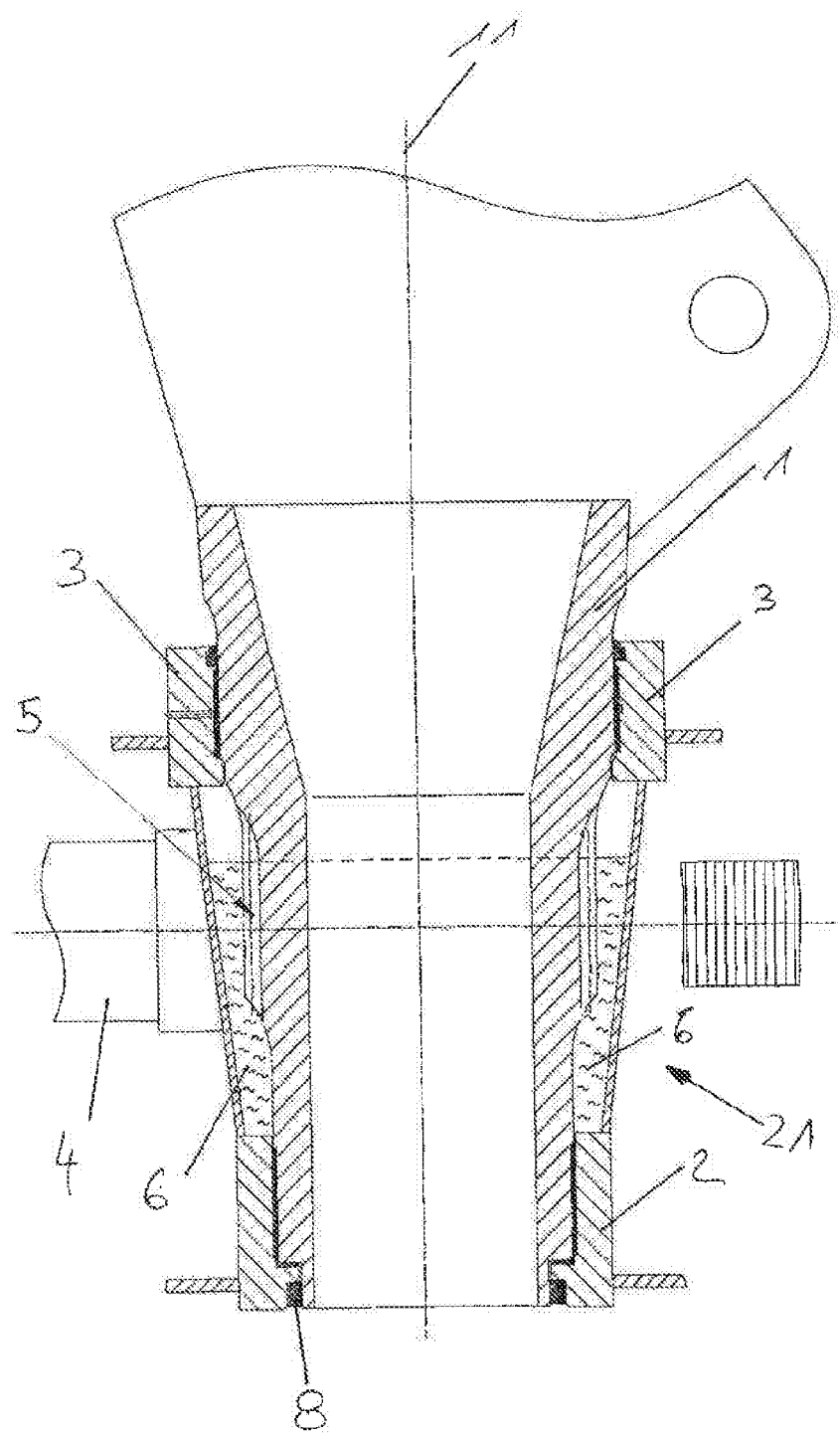
FIG. 3 shows a section through a further crane pillar according to the state of the art.

FIG. 1 shows a side view of a vehicle 50. The crane 100 is mounted on the vehicle 50. In this case, the crane 100 has a crane pillar 1 mounted rotatably about an axis. Extending away from the crane pillar 1 is the crane boom system having a first jib 101 and a second jib 102 hingedly connected to the first jib 101. In this preferred embodiment, the second jib 102 also has a plurality of jib extensions 103 to increase the operating range of the crane boom system.

Figure 4:
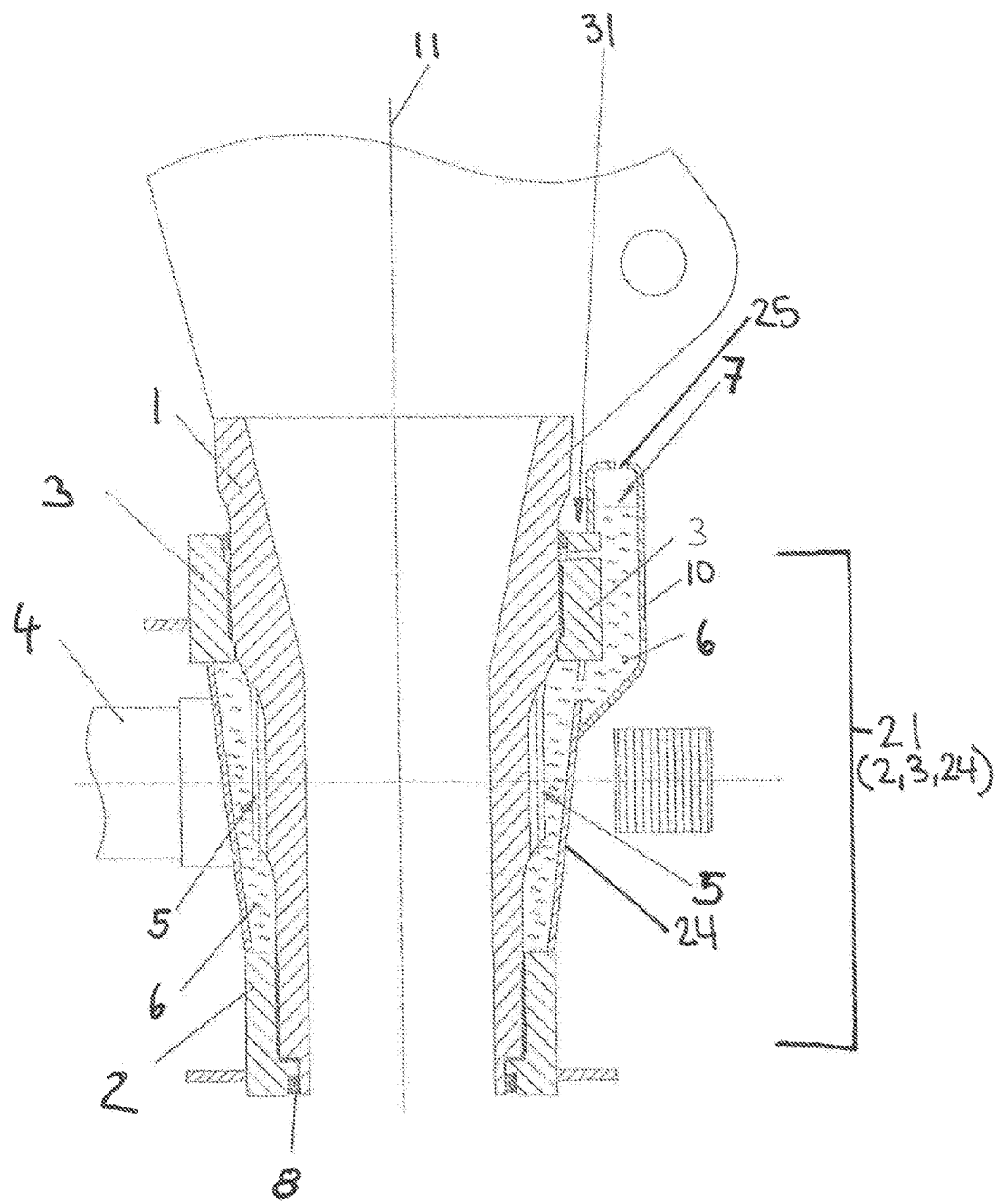
FIG. 4 shows a section through a crane pillar having a chamber which can be filled with oil for the upper radial bearing, and the upper and lower chambers are connected, the filling or compensating container is disposed in the upper region of the base and the oil level in this case is above the upper bearing.

FIG. 4 now shows an embodiment according to the invention of a portion of the crane 100. Here, as with the prior art discussed above, a crane base 21 has a lower radial bearing 2 and an upper radial bearing 3 spaced from the lower radial bearing 2 along the longitudinal center axis 11 of the crane pillar 1 by a conical portion 24. The chamber 10 which can be filled with oil 6 is provided at the upper radial bearing 3, thereby implementing automatic lubrication for the upper radial bearing 3. In other words, the chamber 10 is configured such that, when filled with oil, the oil level 7 is higher than an upper end of the upper radial bearing 3 so as to provide automatic lubrication of the upper radial bearing 3.

In this embodiment, the chamber 10 not only extends around the upper radial bearing 3 but also extends still further downwardly as far as the lower radial bearing 2. This means that it is possible to achieve simultaneous lubrication of the lower radial bearing 2, the region 5 of the crane pillar 1 that is driven by the drive unit 4, and the upper radial bearing 3 by lubricant in a single chamber 10.

In this embodiment, the chamber 10 which can be filled with oil 6 is provided on the crane base 21 which supports the crane pillar 1. More particularly, the chamber is provided on the outside surface of the crane base 21 and at the outside surface of the crane pillar 1, and has an exterior opening 25. It is thus accessible from outside and can be filled with oil from the outside of the crane base 21 and outside of the crane pillar 1.

The fact that the chamber 10 extends over the drive region 5 and over both radial bearings 2 and 3 provides a configuration according to the invention as in that way only one chamber 10 has to be implemented in order to lubricate all three parts, and it is also necessary only once for oil 6 to be introduced into the chamber 10 to ensure lubrication. It is thus possible to save both on material and also time for maintenance operations.

In this embodiment, the crane base 21 also has a thrust bearing 8 for supporting the crane pillar 1. Lubrication of that thrust bearing 8 is also effected by the chamber 10 which can be filled with oil 6.

In addition, as noted above, it is particularly preferable that the chamber 10 which can be filled with oil at the upper radial bearing 3 and in the operating condition of being filled with oil 6, has an oil level 7 which is higher than an upper end 31 of the upper radial bearing 3. Preferably, a rack-and-pinion drive is provided for the drive unit 4, with the tooth arrangement required for same on the crane pillar stub and on the toothed rack, respectively. In this preferred embodiment, therefore, all bearing locations (lower radial bearing 2, upper radial bearing 3) and also the tooth arrangement are in the oil 6 in the oil bath of the chamber 10.

Figure 5:
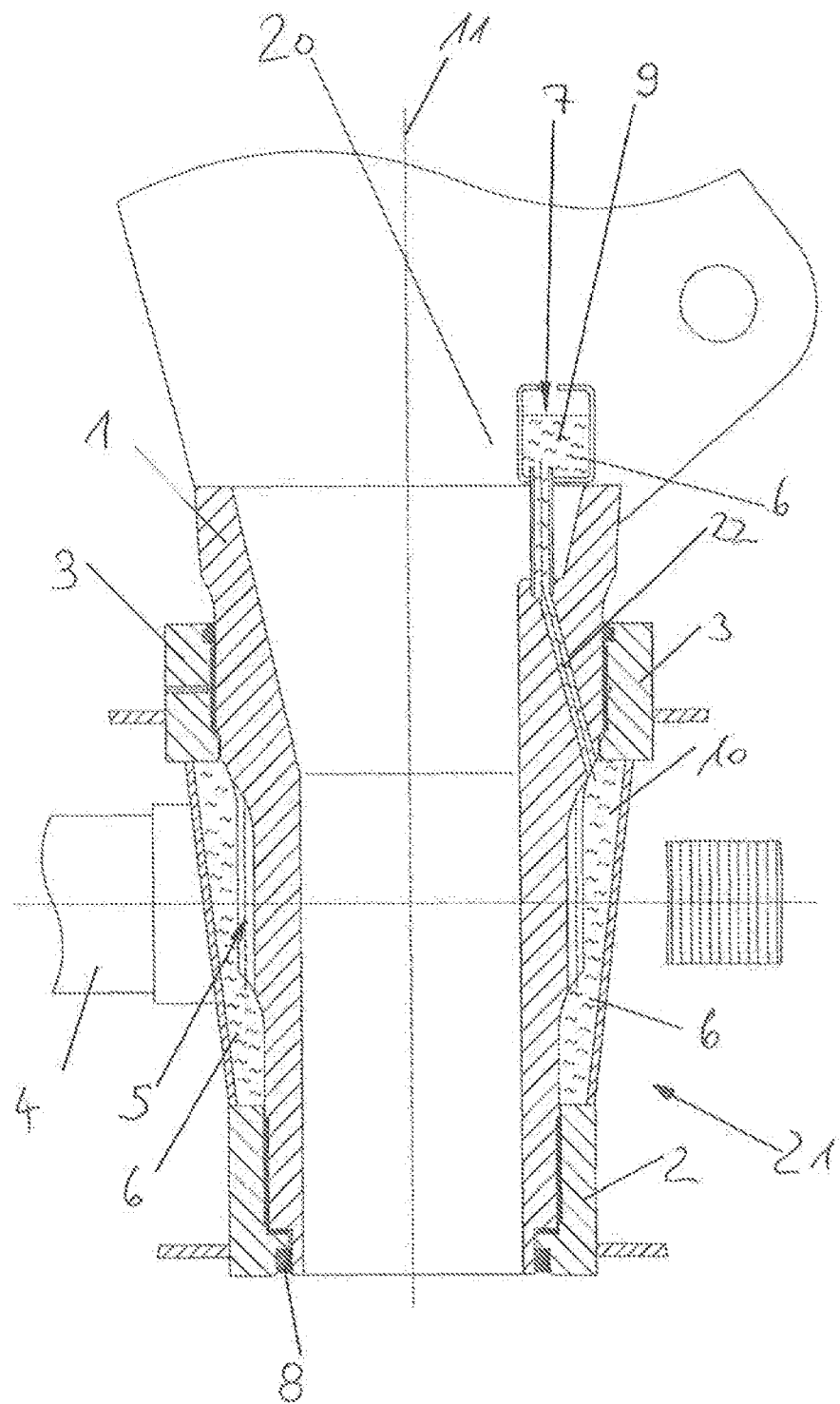
FIG. 5 shows a section through a crane pillar with a chamber which can be filled with oil for the upper radial bearing in the interior of the crane pillar.

FIG. 5 shows a further variant of a crane pillar, in which at least two chambers 10 and 9 can each be filled with oil 6.

In this variant, the upper chamber 9 which can be filled with oil 6 is provided substantially completely in the interior 20 of the rotatable crane pillar 1. This provides a particularly compact variant of a crane pillar 1. A filling opening (not shown) is provided for putting oil 6 into the chamber 9.

This embodiment has two chambers 10 and 9 which can be filled with oil 6 and by way of which lubrication is effected for the upper radial bearing 3, the lower radial bearing 2, the thrust bearing 8, and the drive unit 4. In this case, the upper chamber 9 which can be filled with oil 6 supplies oil to the other (lower) chamber 10 which can be filled with oil 6, more specifically by way of the passage 22 which in this preferred embodiment is also in the interior 20 of the crane pillar 1. In this arrangement, the upper chamber 9 which can be filled with oil 6 is above the other chamber 10 which can be filled with oil 6 and is also above the upper radial bearing 3, whereby this provides for a preferred supply of oil 6 for the chamber 10 and the upper radial bearing 3, respectively.

The invention claimed is:

1. A crane comprising:
   a crane pillar having a longitudinal center axis,
   a crane base rotatably supporting the crane pillar to allow the crane pillar to rotate about the longitudinal center axis, the crane base including:
      a lower radial bearing for rotatably supporting the rotatable crane pillar in the crane base, and
      an upper radial bearing spaced above the lower radial bearing along the longitudinal center axis for rotatably supporting the crane pillar in the crane base,
   a chamber to be filled with oil and configured to simultaneously lubricate the upper radial bearing and the lower radial bearing, and
   a drive unit for driving the crane pillar, the drive unit being located between the upper radial bearing and the lower radial bearing such that oil within the chamber simultaneously lubricates a driven region of the crane pillar engaged with the drive unit while lubricating the upper radial bearing and the lower radial bearing,
   wherein the chamber is at least partially arranged outside of the crane base and outside of the crane pillar so as to at least partially enclose the crane base and the crane pillar, and the chamber having an exterior opening to allow access to and filling of the chamber from outside of the crane base and outside of the crane pillar.

2. The crane as set forth in claim 1, wherein lubrication of the lower radial bearing is effected by the chamber to be filled with oil.

3. The crane as set forth in claim 1, further comprising a thrust bearing for supporting the crane pillar, wherein lubrication of the thrust bearing of the crane pillar is effected by the chamber to be filled with oil.

4. The crane as set forth in claim 1, wherein the chamber is configured such that when filled with oil, the chamber has an oil level higher than an upper end of the upper radial bearing.

5. The crane as set forth in claim 1, wherein the chamber is a first one of at least two chambers, a second one of the at least two chambers being configured to be filled with oil and provided substantially completely in an interior of the rotatable crane pillar.

6. The crane as set forth in claim 5, wherein the second one of the at least two chambers to be filled with oil is provided above the upper radial bearing.

7. The crane as set forth in claim 1, wherein the chamber is a first one of at least two chambers to be filled with oil and by way of which lubrication of the upper radial bearing is effected.

8. The crane as set forth in claim 7, wherein a second one of the at least two chambers to be filled with oil supplies oil to the first one of the at least two chambers to be filled with oil.

9. The crane as set forth in claim 7, wherein the at least two chambers to be filled with oil are connected together by a passage.

10. The crane as set forth in claim 9, wherein the passage is provided in the interior of the crane pillar.

11. The crane as set forth in claim 7, wherein the first one of the at least two chambers to be filled with oil is provided below a second one of the at least two chambers to be filled with oil.

12. A vehicle comprising a crane as set forth in claim 1.

* * * * *